(12) United States Patent
Jeong et al.

(10) Patent No.: US 8,270,051 B2
(45) Date of Patent: Sep. 18, 2012

(54) METHOD OF RECORDING HOLOGRAPHIC INFORMATION USING HOLOGRAM MARK AND HOMOGENEOUS MARK

(75) Inventors: Taek-seong Jeong, Suwon-si (KR); Tae-kyoung Kim, Seoul (KR); Jae-cheol Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 498 days.

(21) Appl. No.: 12/503,192

(22) Filed: Jul. 15, 2009

(65) Prior Publication Data

US 2010/0020375 A1     Jan. 28, 2010

(30) Foreign Application Priority Data

Jul. 25, 2008 (KR) .................. 10-2008-0073049

(51) Int. Cl.
*G03H 1/02* (2006.01)
(52) U.S. Cl. .................. 359/3; 359/11; 359/30
(58) Field of Classification Search .......... None
See application file for complete search history.

(56) References Cited

U.S. PATENT DOCUMENTS

| | | | |
|---|---|---|---|
| 6,400,474 B2* | 6/2002 | Shirakura | 359/23 |
| 6,486,982 B1* | 11/2002 | Davis | 359/9 |
| 6,781,725 B2* | 8/2004 | Zgonik | 359/35 |
| 2003/0073007 A1* | 4/2003 | Lahrichi | 430/1 |
| 2005/0157613 A1 | 7/2005 | Ogasawara et al. | |
| 2007/0076563 A1 | 4/2007 | Uchida et al. | |
| 2007/0237050 A1 | 10/2007 | Roh et al. | |
| 2009/0010135 A1 | 1/2009 | Ushiro et al. | |

FOREIGN PATENT DOCUMENTS

| | | |
|---|---|---|
| EP | 1 562 185 A1 | 8/2005 |
| EP | 1 734 515 A1 | 12/2006 |
| JP | 2005-107338 | 4/2005 |
| KR | 10-2006-0043988 | 5/2006 |
| KR | 10-2007-0035049 | 3/2007 |
| KR | 10-2007-0105218 | 10/2007 |

OTHER PUBLICATIONS

Extended European Search Report issued on Nov. 26, 2009, in counterpart European Application No. 09166487.0 (5 pages).

* cited by examiner

*Primary Examiner* — Arnel C Lavarias
(74) *Attorney, Agent, or Firm* — NSIP Law

(57) ABSTRACT

A method of recording holographic information includes recording a hologram mark and a homogeneous mark in a holographic data storage medium with a volume to alternatively locate the hologram mark and the homogeneous mark. The hologram mark has a varied refractive index distribution due to constructive/destructive interferences between two light beams and indicates information, while the homogeneous mark has a more uniform refractive index distribution than the hologram mark.

12 Claims, 12 Drawing Sheets

METHOD OF RECORDING HOLOGRAPHIC INFORMATION USING HOLOGRAM MARK AND HOMOGENEOUS MARK

CROSS-REFERENCE TO RELATED APPLICATIONS

This application claims the benefit of Korean Patent Application No. 10-2008-0073049, filed on Jul. 25, 2008, in the Korean Intellectual Property Office, the disclosure of which is incorporated herein in its entirety by reference.

BACKGROUND OF THE INVENTION

1. Field of the Invention

Aspects of the present invention relate to a method of recording holographic information, and more particularly, to a method of recording holographic information that ensures uniform recording quality of a mark and inhibits the occurrence of aberrations in recording/reproduction spots during recording of data on a plurality of recording layers to improve signal quality.

2. Description of the Related Art

In recent years, data storage technology using holograms has attracted considerable attention. A method of storing data using holograms includes storing data in the shape of optical interference fringes in inorganic crystals or in polymer materials that are sensitive to light. An optical interference fringe is formed by two laser beams with coherency. That is, a reference beam and a signal beam travelling along different paths interfere with each other to form an interference fringe that causes chemical or physical changes to a photosensitive storage medium, thus recording data in the photosensitive storage medium. In order to reproduce data from the recorded interference pattern, a reference beam similar to the reference beam used for recording the data is irradiated to the interference pattern recorded in the photosensitive storage medium. As a result, diffraction occurs due to the interference pattern, so that the signal beam is restored to reproduce the data.

The above-described hologram data storage technology includes a volume holography method in which data is recorded and reproduced in page units using volume holography and a micro-holography method in which data is recorded and reproduced bit by bit using micro-holography. In the volume holography method, a vast amount of data may be processed at the same time, but it is difficult to make data storage devices based on this method commercially available since an optical system based on the volume holography method requires very fine adjustments.

In the micro-holography method, two condensed beams are directed to interfere with each other at a focus to form a fine interference fringe. Data storage is accomplished by moving the fine interference fringe on a plane of a data storage medium so that a large amount of data is recorded, thereby forming a recording layer. A plurality of such recording layers may be formed in a depth-wise direction of the data storage medium by superposition, thereby three-dimensionally recording data on the data storage medium.

In order to increase recording capacity in the micro-holography method, a plurality of recording layers may be formed or data may be recorded by overlapping a plurality of wavelengths using wavelength-selective reflection characteristics of a hologram.

However, during a recording process, the sensitivity of a photosensitive data storage medium in which a hologram is recorded (hereinafter, referred to as "holographic data storage medium") gradually decreases. Specifically, the sensitivity of the holographic data storage medium to incident energy is reduced during the recording process so that even if data is recorded with the same energy, the diffraction efficiency of the hologram may be less than at the beginning. Accordingly, when data is recorded with the same energy, a portion where at least two holographs overlap one another has reduced diffraction efficiency. Therefore, a portion where a previously recorded mark overlaps an additionally recorded mark may have a varied reflection rate in a multi-wavelength recording mode.

Also, when data is recorded to form a plurality of recording layers, a plurality of hologram marks are present in a space through which recording/reproduction beams travel. A portion of the holographic data storage medium where the hologram mark is formed has a different refractive index from nearby portions. Since the phase of light directed at a particular position of the holographic data storage medium including a hologram mark is altered due to the difference in the refractive index of the hologram mark compared to surrounding regions, a wave front of the light is varied by as much as a non-uniformity in a refractive index distribution. Accordingly, when data is recorded on or reproduced from a recording layer disposed far from the surface of the holographic data storage medium, a wave front of light traveling through an already recorded hologram mark is distorted, and the wave front distortion (or wave front aberration) affects the recording beams. An increase in wave front aberrations may lead to deformation of optical spots that converge into a focus, thus increasing the size of the optical spots. The increase in the size of the optical spots may result in deterioration of formation of a recording mark in a recording mode and quality degradation of a reproduction signal in a reproduction mode.

SUMMARY OF THE INVENTION

Aspects of the present invention provide a method of recording holographic information using a micro-holographic data recording/reproduction apparatus capable of recording a plurality of recording marks in a uniform medium having a volume. The method may ensure a uniform recording quality of marks during wavelength multiplexing and inhibit occurrence of aberrations in recording/reproduction spots during recording of data on a plurality of recording layers to improve signal quality.

According to an embodiment of the present invention, there is provided a method of recording holographic information, which includes recording a hologram mark and a homogeneous mark in a holographic data storage medium having a volume to alternatively locate the hologram mark and the homogeneous mark. The hologram mark has a varied refractive index distribution due to constructive/destructive interferences between two light beams and indicates information, while the homogeneous mark has a more uniform refractive index distribution than the hologram mark.

According to an aspect of the present invention, a thickness or refractive index variation of the homogeneous mark may be controlled such that a phase shift of a light beam passing through the homogeneous mark is about the same as a phase shift of a light beam passing through the hologram mark.

According to an aspect of the present invention, the homogeneous mark may be recorded by a first light source and the hologram mark may be recorded by a second light source.

According to an aspect of the present invention, after one of two light beams used for recording the hologram mark is cut off, the homogeneous mark may be recorded using the remaining light beam.

According to an aspect of the present invention, the homogeneous mark may be recorded by changing a focal position of one of two light beams used for recording the hologram mark to reduce formation of an interference fringe.

According to an aspect of the present invention, the hologram mark and the homogeneous mark may be recorded using the same light source while varying coherence by changing driving conditions.

According to an aspect of the present invention, the hologram mark and the homogeneous mark may be alternately recorded on all recording layers.

According to an aspect of the present invention, only a hologram mark may be recorded in at least one recording layer that affects less to an adjacent recording layer out of all recording layers, while a hologram mark and a homogeneous mark may be alternately recorded on the remaining recording layers.

According to another embodiment of the present invention, there is provided a method of recording holographic information, including irradiating a holographic data storage medium with a first light beam and a second light beam according to data to be recorded, such that a plurality of hologram marks each having a varied refractive index distribution due to constructive/destructive interferences between the first light beam and the second light beam are formed in the holographic data storage medium, and forming a plurality of homogeneous marks interspersed between the plurality of hologram marks, each homogeneous mark having a refractive index distribution that is more uniform than the refractive index distribution of the hologram marks.

According to another embodiment of the present invention, there is provided a holographic data recording/reproducing apparatus that records hologram marks and homogenous marks on a holographic data storage medium, the holographic data recording/reproducing apparatus including an optical pickup unit including a light source, an optical path separator that divides light from the light source into a first light beam and a second light beam, a first light path and a second light path along which the first light beam and the second light beam, respectively, are directed to be incident on the holographic data storage medium, a first focus variation unit and a second focus variation unit that selectively focus the first light beam and the second light beam, respectively, such that hologram marks each having a varied refractive index distribution due to constructive/destructive interferences between the first light beam and the second light beam are selectively formed on the hologram data storage medium; and a shutter that selectively blocks the first light path; and a controller that controls one of the light source, the first focus variation unit and the shutter such that homogeneous marks each having a refractive index distribution that is more uniform than the refractive index distribution of the hologram mark are selectively formed on the hologram data storage medium.

According to another aspect of the present invention, there is provided a holographic data recording/reproducing apparatus that records hologram marks and homogenous marks on a holographic data storage medium, the holographic data recording/reproducing apparatus including an optical pickup unit including a first light source, a first optical path separator that divides light from the first light source into a first light beam and a second light beam, a first light path and a second light path along which the first light beam and the second light beam, respectively, are directed to be incident on the holographic data storage medium, a first focus variation unit and a second focus variation unit that selectively focus the first light beam and the second light beam, respectively, such that hologram marks each having a varied refractive index distribution due to constructive/destructive interferences between the first light beam and the second light beam are selectively formed on the hologram data storage medium; a second light source; and a second optical path separator that directs light from the second light source to travel through the first light path or the second light path such that a homogeneous mark is formed on the hologram data storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent and more readily appreciated from the following description of the embodiments, taken in conjunction with the accompanying drawings of which.

DETAILED DESCRIPTION OF THE EMBODIMENTS

Figure 1:
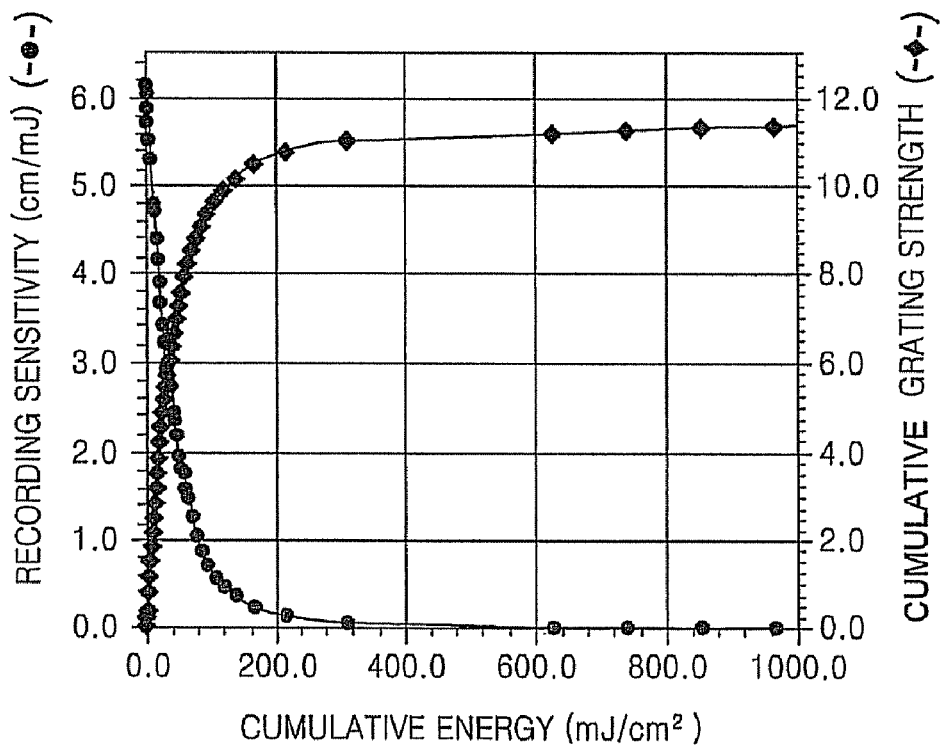
FIG. 1 is a graph showing variations in cumulative grating strength (M#) and recording sensitivity of a holographic data storage medium according to cumulative energy provided during recording.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to existing multilayered optical recording technology, respective recording layers are stacked on a data storage medium so that the recording capacity of the data storage medium may be increased by recording data using optical absorption of the recording layers. However, this method involves a very complicated process of stacking a plurality of recording layers and leads to a reduction in yield, thereby increasing the production cost of the data storage medium.

A micro-holographic recording method in which a plurality of virtual layers are stacked in a uniform recording material has been proposed as a new optical recording technique capable of recording/reproducing high-capacity data at lower cost than existing optical recording techniques. According to the micro-holographic recording method, an actual recording layer is not present in a recording medium, but a recording mark is recorded parallel to the surface of the recording medium at an arbitrary height. Then, a recording operation is repeated by changing the height at which the recording mark is recorded, so that a plurality of recording layers on which data is recorded can be stacked so as to increase recording capacity.

The recording medium used in the micro-holographic recording method may be formed of a uniform medium. At least one reference surface may be formed on the recording medium to provide a reference in the height direction of the recording layer. Foci of two beams traveling in opposite directions are formed in the recording medium using beams incident to one side or both sides of the recording medium at a desired height, determined using the reference surface, and interfere with each other to provide a fine interference fringe recorded as a hologram mark.

The hologram mark is recorded on a virtual surface parallel to (or with the same height to) the surface of the recording medium. The recorded virtual surface has a similar shape as a recording layer of a data storage medium used in a conventional optical recording technique. After one recording layer is recorded, a new recording layer is recorded by adjusting the height of an optical focus appropriately. An interval between recording layers may vary depending on a recording method, the size of optical foci, and a method of measuring signals. In order to achieve high recording density, the interval between recording layers may range from several μm to several tens of μm. A plurality of recording layers may be stacked by repeating the above-described process, so it is possible to increase recording capacity. Also, in order to increase recording capacity, data may be recorded by overlapping a plurality of hologram marks formed at different wavelengths using the wavelength-selective reflection characteristics of a hologram.

However, the sensitivity of a holographic data storage medium decreases during recording due to the reaction of the holographic data storage medium during recording. In other words, the reaction rate of the holographic data storage medium to incident energy decreases as recording progresses so that even if data is recorded with the same energy, the diffraction efficiency of the hologram becomes less, as shown in FIG. 1.

FIG. 1 is a graph showing variations in cumulative grating strength (M#) (-♦-) and recording sensitivity (-●-) of a holographic data storage medium during recording.

Referring to FIG. 1, it can be seen that when incident energy accumulates during a recording proceeding, the recording sensitivity of the holographic data storage medium sharply decreases, and the cumulative grating strength M# thereof quickly reaches a limit. The cumulative grating strength M#, which is the sum of square roots of diffraction efficiencies of the holographic data storage medium, is an index of recording capacity of the holographic data storage medium. The sensitivity of the holographic data storage medium corresponds to an increment in the cumulative grating strength M# relative to incident energy.

As stated above, the diffraction efficiency of the holographic data storage medium drastically decreases even when the same energy is used throughout the recording process. Thus, when data is recorded with the same energy, the reflectivity at a portion where two holograms overlap each other becomes less efficient.

Figure 2:
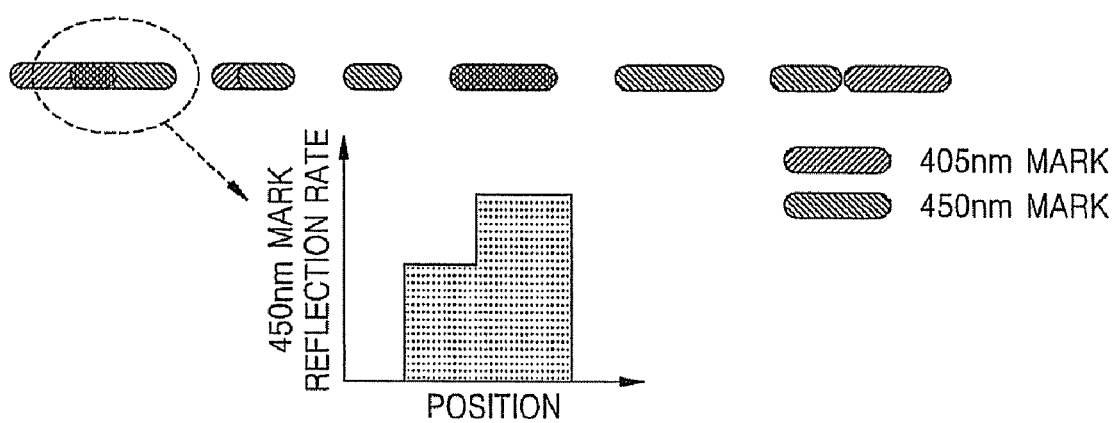
FIG. 2 is a diagram for explaining a variation in reflection rate of an additional recording mark due to overlapping of marks in a multi-wavelength recording.

For example, when data is recorded on the same layer using 405 nm-wavelength light and 450 nm-wavelength light, a portion whose reflection rate is varied due to the overlapping of the marks may be generated as shown in FIG. 2.

Referring to FIG. 2, a portion of a left mark out of marks recorded using the 450 nm-wavelength light overlaps a mark recorded using the 405 nm-wavelength light. As can be seen from a graph of FIG. 2, even if data is recorded with the same energy, the reflection rate of the overlapped portion is less than that of an non-overlapped portion. Therefore, performing a multi-wavelength recording operation on a single layer may be difficult due to a difference in reflection rate between the overlapped portion and the non-overlapped portion.

Although there is a method of recording data by spacing layers according to wavelengths, this method requires an additional driver unit capable of precisely controlling layers according to wavelength to maintain the layers at an interval of, for example, about 1~2 μm.

When data is recorded on a plurality of recording layers, a plurality of hologram marks are present in a space through which recording/reproduction beams travel. A portion of the holographic data storage medium where the hologram mark is formed has a different refractive index from nearby portions. Since the phase of light directed at a particular position of the holographic data storage medium that includes a hologram mark is altered due to the difference in the refractive index of the hologram mark compared to that of surrounding regions, a wave front of the light is varied by as much as a non-uniformity in a refractive index distribution.

Accordingly, when data is recorded on or reproduced from a recording layer disposed far from the surface of the holographic data storage medium, a wave front of light traveling through an already recorded hologram mark is distorted, and the wave front distortion (or wave front aberration) affects recording beams. An increase in wave front aberrations may lead to deformation and an increase in size of optical spots that converge into a focus. The increase in the size of the optical spots may result in a deterioration of the formation of a recording mark in a recording mode and a quality degradation of a reproduction signal in a reproduction mode. In a micro-holography method, the Strehl ratio (SR) is known to be approximately expressed as in Equation 1. The Strehl ratio (SR) is a ratio of distortion of an ideal Gaussian beam due to aberrations.

$$SR = 1 - M_\eta \quad (1),$$

wherein M denotes the number of layers through which incident light passes, and η denotes the diffraction efficiency of each hologram mark. The aberrations are equally applied to two beams (i.e., a signal beam and a reference beam) that form a focus.

For example, assuming that twenty recording layers are recorded and the reflection rate of each hologram mark is 1%, when the uppermost layer is finally recorded, the Strehl ratio (SR) of incident light traveling upward from below a holographic data storage medium far from an initial incidence surface of the holographic data storage medium is only 0.6, which corresponds to an aberration of about 100 mλ greater than a known aberration limit (about 70 mλ) of a typical optical recording technique.

Accordingly, when the last layer is finally recorded, recording characteristics may be seriously degraded due to the aberrations. For the same reason, when the lowermost layer is reproduced, the aberration reaches about 70 mλ, thus bringing about a marginless system. This problem becomes more serious as the number of recording layers increases.

By simple calculation, when a system with a hologram-mark diffraction efficiency of about 1% includes more than twenty recording layers, even if the system is near perfect, reproduction of the lowermost layer may result in signal degradation.

According to a method of recording holographic information according to an exemplary embodiment, a micro-holographic data recording/reproduction apparatus capable of recording a plurality of layers in a medium with a volume may ensure a uniform recording quality of a mark during wavelength multiplexing and inhibit occurrence of aberration in recording/reproduction spots in a multilayered recording mode so as to improve signal quality. Specifically, a method of recording holographic information according to an embodiment of the present invention includes recording a homogeneous mark (i.e., a non-fringe mark) with no or few interference fringes and a more uniform refractive index than a hologram mark in a portion of the holographic data storage medium apart from the hologram mark.

As explained above, in a micro-holography technique of forming a plurality of recording layers on a uniform holographic data storage medium to achieve high recording/reproduction density, two incident light beams may be used (or a light beam already used to form a focus is reused) and incident to one side or both sides of the holographic data storage medium.

Two light beams are directed to interfere with each other at a focus to form an interference fringe, and the refractive index of the holographic data storage medium is periodically varied according to the interference fringe to enable information recording. An interference fringe is not recorded in a portion of the holographic data storage medium having no mark. Optical systems used for recording/reproducing micro-holographic information may be divided into categories of a one-sided incidence optical system in which light is incident to one side of a holographic data storage medium and a two-sided incidence optical system in which light is incident to both sides of a holographic data storage medium. In addition, an optical system using a retro-reflector may reflect light passing through a medium to record/reproduce micro-holographic information.

In the micro-holography technique, since a recording mark is basically formed using a variation in refractive index of a medium, aberration may occur in incident light due to a hologram mark.

A method of recording holographic information according to an exemplary embodiment of the present invention includes reducing aberrations. Basic principles of the method will be described with reference to FIGS. 3A through 3D.

FIGS. 3A through 3D are schematic diagrams illustrating a method of recording micro-holographic information according to an exemplary embodiment of the present invention. Although FIGS. 3A through 3D exemplarily illustrate that two light beams are incident to respective sides of a holographic data storage medium, the method of recording holographic information according to an embodiment of the present invention may be applied not only to a two-sided incidence holographic data recording/reproduction apparatus but also to a one-sided incidence holographic data recording/reproduction apparatus in which two light beams are incident to one side of a holographic data storage medium.

Figure 6:
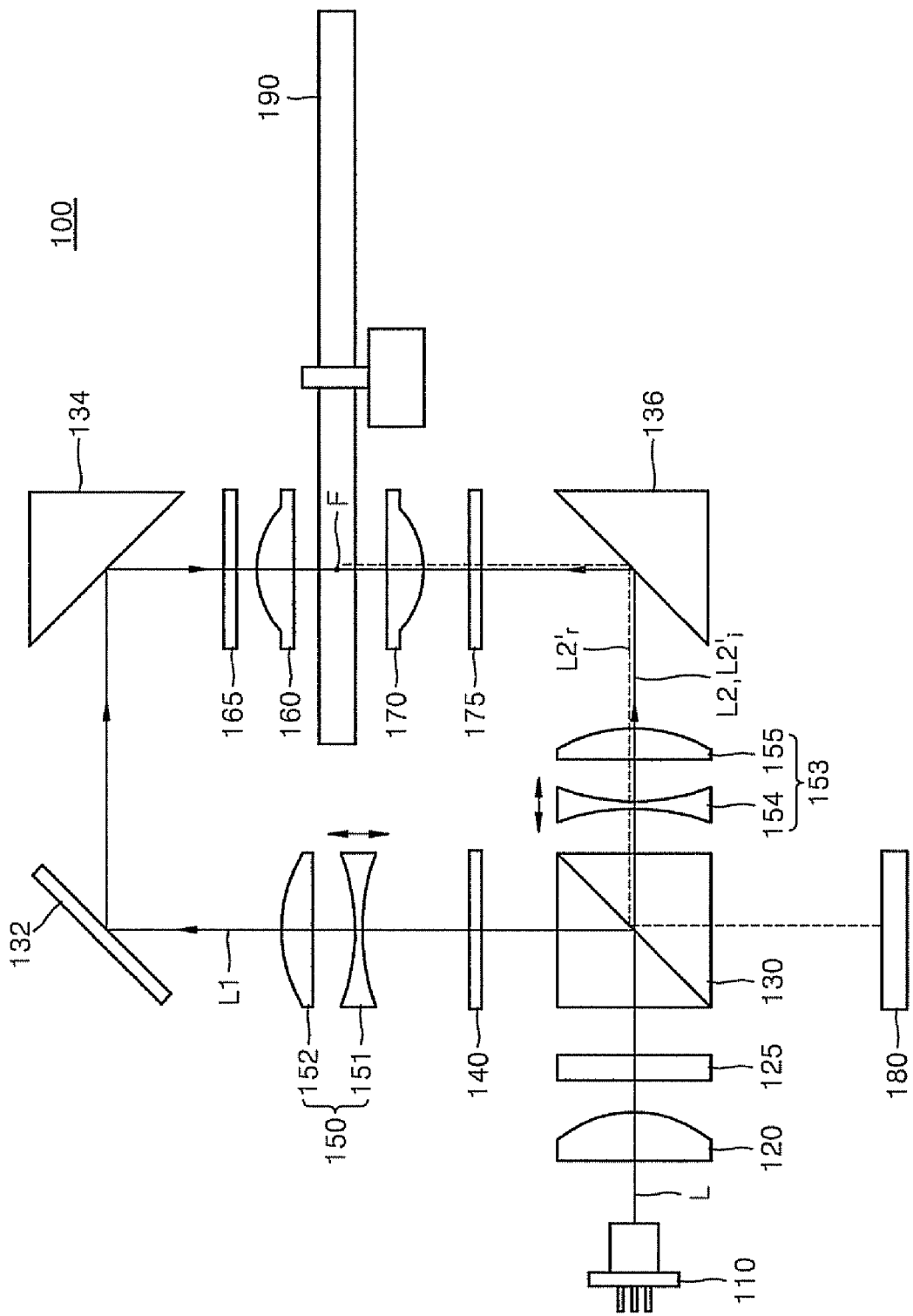
FIG. 6 is a schematic diagram showing an example of an optical construction of a holographic data recording/reproduction apparatus capable of embodying a method of recording holographic information according to an exemplary embodiment of the present invention.

FIGS. 3A through 3D illustrate a variation in incident light over time and formation of a recording mark in a recording mode. That is, FIGS. 3A through 3D illustrate a partial process of recording information by time-controlling incident light according to rotation of a holographic data storage medium 190. FIGS. 3A through 3D illustrate a case in which a holographic data recording/reproduction apparatus of FIG. 6 is applied. Thus, first and second objective lenses 160 and 170 will be described later.

Information may be recorded in the order of, for example, FIGS. 3A through 3D. In FIGS. 3A through 3D, two kinds of recording marks are formed. One kind of recording mark is a hologram mark 10a with the same shape as a conventional micro-hologram mark. The hologram mark 10a has an interference fringe (or hologram) formed by two light beams traveling in opposite directions. Also, the hologram mark 10a has a periodically varied refractive index distribution and represents information (or data). The other kind of recording mark is a homogeneous mark 10b providing a refractive index distribution that is more uniform than that provided by the hologram mark 10a.

The hologram mark 10a and the homogeneous mark 10b may be formed in various manners. FIGS. 3A through 3D exemplarily illustrate a method of forming the hologram mark 10a and the homogeneous mark 10b using a shutter 140. For clarity of explanation, an optical system in which incident light beams are separately incident to respective sides of the holographic data storage medium 190 is illustrated in FIGS. 3A through 3D.

Figure 3A:
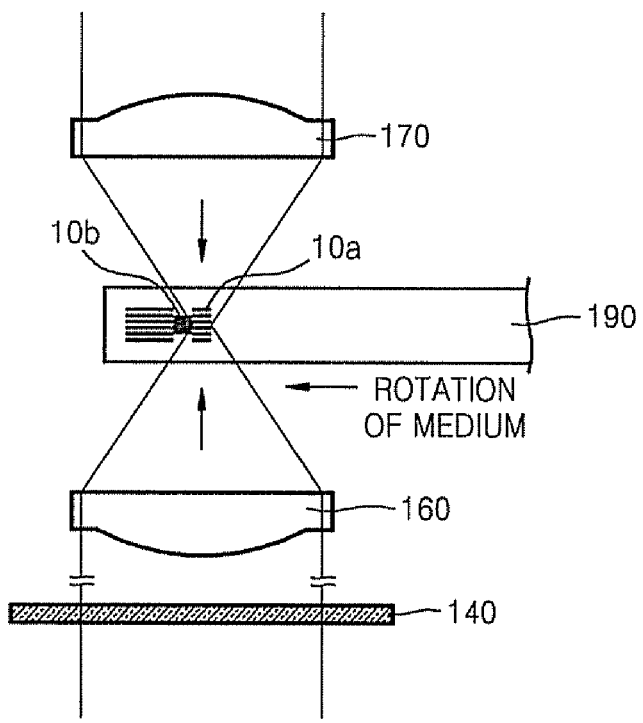
FIGS. 3A through 3D are schematic diagrams illustrating a method of recording micro-holographic information using a shutter according to an exemplary embodiment of the present invention.
Figure 3B:
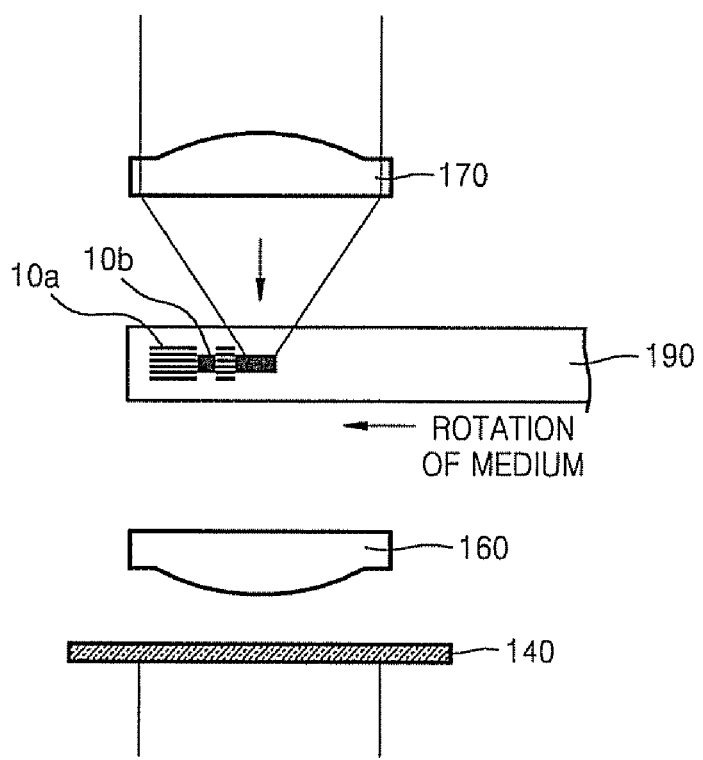
Figure 3C:
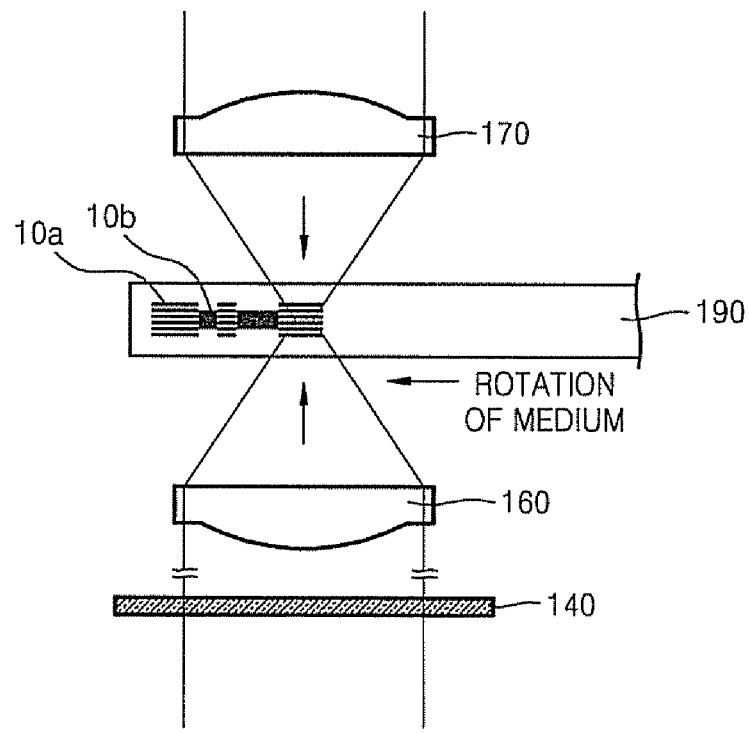

Referring to FIGS. 3A and 3C, when two light beams are incident from a light source to respective sides of the holographic data storage medium 190 and converge into a focus, an interference fringe is formed. Since the refractive index of the holographic data storage medium 190 varies in proportion to the intensity of the interference fringe, the hologram mark 10a, which is illustrated with a fringe, is recorded in the holographic data storage medium 190 due to a periodic variation in refractive index. The focus is located on a virtual recording layer on which the hologram mark 10a is to be formed.

Figure 3D:
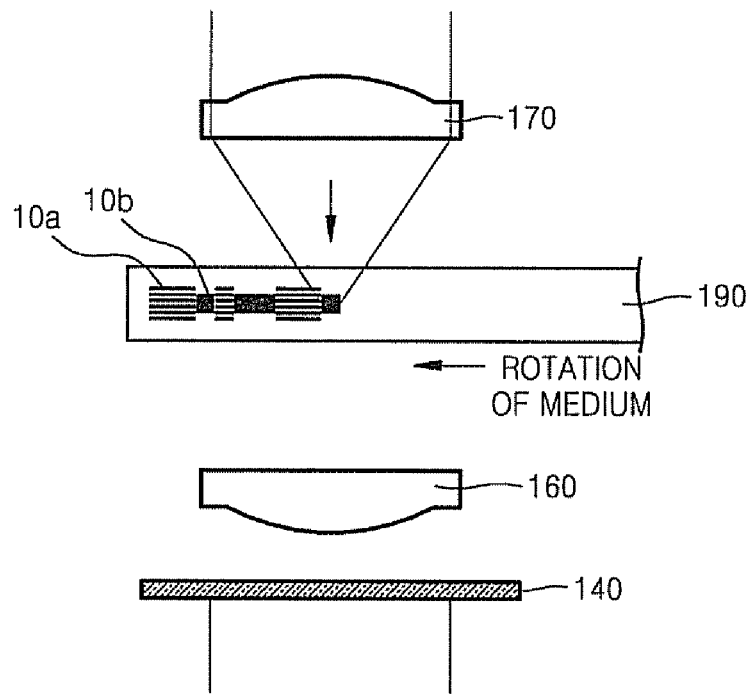

Referring to FIGS. 3B and 3D, after the hologram mark 10a has been formed and the medium 190 is rotated so that the focus is located where a mark has not yet been formed, one of two incident light beams is cut off by the shutter 140 such that only the remaining incident light beam is incident to the holographic data storage medium 190 and converges into a focus. The refractive index of the holographic data storage medium 190 is altered due to the intensity of the incident light beam. In this case, since no interference fringe is formed, the refractive index of the holographic data storage medium 190 is varied only according to optical intensity to record a homogeneous mark 10b. FIGS. 3B and 3D illustrate uniform variations in refractive index, which may be obtained in the holographic data storage medium 190 with a critical reaction value. Here, the holographic data storage medium 190 with the critical reaction value may be formed of a material whose refractive index varies only at a predetermined energy or more.

Due to the drive of the shutter 140, the hologram mark 10a with interference fringes and the homogeneous mark 10b with a uniform variation in refractive index are alternately formed in the holographic data storage medium 190.

The recording method shown in FIGS. 3A through 3D may be modified. For example, a recording layer may be formed in which hologram marks 10a are recorded, and then, one light beam may be cut off using the shutter 140, and the homogeneous marks 10b may be recorded between the hologram marks 10a.

According to the method of recording holographic information according to the present exemplary embodiment, the homogeneous mark 10b is recorded in a region of a recording layer where the hologram mark 10a is not recorded.

Therefore, unlike a conventional micro-holography method, which leaves a vacancy between hologram marks, according to the method of the present exemplary embodiment, a homogeneous marks 10b, with a uniform variation in refractive index, are provided between the hologram marks 10a.

Since the holographic data storage medium 190 has a very low refractive index variation of about 0.01 or less, the homogeneous mark 10b may have a very low reflection rate of about $1e^{-3}$% or less. Of course, since a critical reaction of the holographic data storage medium 190 is imperfect, as the refractive index at boundaries slowly decreases, the reflection rate of the homogeneous mark 10b in an optical axis direction may further decrease.

On the other hand, since light is reflected by the hologram mark 10a due to interference between a plurality of repetitive patterns, the hologram mark 10a may have a much higher reflection rate than the homogeneous mark 10b. For example, when interference fringes have a thickness of about 3 μm and a refractive index variation of the hologram mark 10a has a maximum value of about 0.01, the hologram mark 10a has a reflection rate of about 5%. Thus, the homogeneous mark 10b produces no or very little effect on a reproduction signal.

Meanwhile, recording conditions may be controlled in a recording mode such that a light beam passing through the homogeneous mark 10b has about the same phase shift as a light beam passing through the hologram mark 10a. As a result, aberrations of incident beams generated during passing through the recording layer in recording can be removed.

Figure 4:
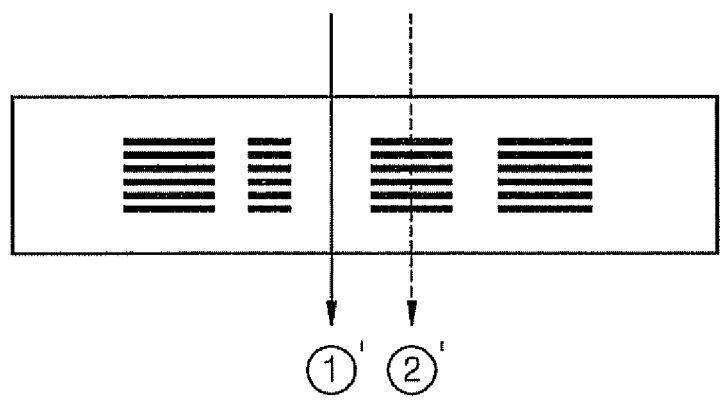
FIG. 4 is a diagram illustrating a process of forming a recording mark according to a existing method of recording holographic information, wherein a light beam passing through a region between hologram marks has a different phase shift from a light beam passing through the hologram mark.

FIG. 4 is a diagram illustrating a process of forming a recording mark in which light beams pass through an already-recorded layer, according to a conventional method of recording holographic information. Referring to FIG. 4, it can be seen that a light beam ①' passing through a region between hologram marks of an already-recorded layer would have a different phase shift from a light beam ②' passing through the hologram mark.

Figure 5:
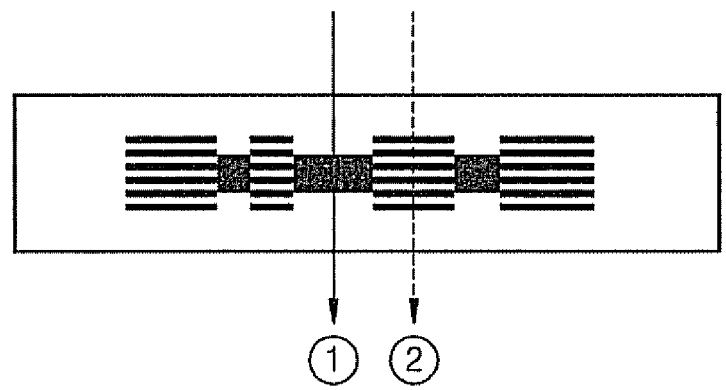
FIG. 5 is a diagram illustrating a process of forming a recording mark according to a method of recording holographic information according to an exemplary embodiment of the present invention, wherein a homogeneous mark is formed between hologram marks and a light beam passing through the homogeneous mark has about the same phase shift as a light beam passing through the hologram mark.

FIG. 5 is a diagram illustrating a process of forming a recording mark in which light beams pass through an already-recorded layer, according to a method of recording holographic information according to an exemplary embodiment of the present invention. Referring to FIG. 5, it can be seen that a homogeneous mark is formed between hologram marks so that a light beam ① passing through the homogeneous mark of the already-recorded layer would have about the same phase shift as a light beam ② passing through the hologram mark.

As can be seen from FIGS. 4 and 5, when data is recorded by controlling the recording conditions to nearly equalize the phase shift of a light beam passing through a homogeneous mark with that of a light beam passing through a hologram mark of an already-recorded layer, a variation in phase according to the position of the light beam hardly occurs, thereby minimizing aberrations of incident light beams generated during passing through a recording layer.

Meanwhile, when the homogeneous mark 10b is formed in a region where the hologram mark 10a is not present, consumption of the holographic data storage medium 190 in a region with the hologram mark 10a is similar to that of the holographic data storage medium 190 in the region without the hologram mark 10a. As a result, a non-uniformity in the mark reflection rate can be eliminated unlike in a conventional multi-wavelength recording mode, thereby improving signal quality. That is, the homogeneous mark 10b is formed between the hologram marks 10a in a single recorded recording layer so that the entire recording layer is irradiated with energy at one time. Thus, when a recording layer recorded using a light beam with one wavelength is then recorded using a light beam with another wavelength during multi-wavelength overlapping, all regions are irradiated with energy the same number of times. Therefore, a non-uniformity in mark reflection rate hardly occurs due to the multi-wavelength overlapping, thereby improving signal quality.

In the method of recording holographic information according to the exemplary embodiment of the present invention, the homogeneous mark 10b is not limited to the perfectly homogeneous mark shown in FIGS. 3A, 3B, and 5. The homogeneous mark may also include a mark in which there is no difference between constructive and destructive portions of interference fringes or a mark in which there is a smaller difference therebetween than the hologram mark 10a such that the homogeneous mark has a very low reflection rate. The thickness or refraction index variation of the homogeneous mark 10b may depend on the kind or state of the holographic data storage medium 190. Basically, the thickness or refraction index variation of the homogeneous mark 10b should be determined such that the homogeneous mark 10b allows about the same consumption of the holographic data storage medium 190 as the hologram mark 10a and a light beam passing through the homogeneous mark 10b has about the same phase shift as a light beam passing through the hologram mark 10a.

Since the hologram mark 10a shows a periodic variation in refractive index due to constructive and destructive inferences, the homogeneous mark 10b may be formed to have about the same thickness as the hologram mark 10a and to have a refractive index that is the average of the periodic variation of the hologram mark 10a. Also, the homogeneous mark 10b may show a variation in refractive index corresponding to constructive interference and have about half the thickness of the hologram mark 10a.

FIGS. 3A through 3D further illustrate a method of recording holographic information using the shutter 140, which may be, for example, an acoustic-optic modulator, according to the exemplary embodiment of the present invention. The shutter 140 allows one of two incident light beams to pass therethrough or cuts off one of the two incident light beams. Thus, when one of the incident light beams passes through the shutter 140, the hologram mark 10*a* is recorded, while when one of the incident light beams is cut off, the homogeneous mark 10*b* is recorded.

In order to embody the method of recording holographic information according to the exemplary embodiment, a focus controller may be introduced instead of the shutter 140. Alternatively, while employing light beams emitted from a single light source, coherence may be changed by modifying driving conditions of the light source. Alternatively, two independent light sources may be adopted.

Hereinafter, various examples of an optical construction of a holographic data recording/reproduction apparatus to which the method of recording holographic information according to an embodiment of the present invention can be applied will be explained.

FIG. 6 is a schematic diagram showing an example of an optical construction of a holographic data recording/reproduction apparatus that may embody a method of recording holographic information according to an exemplary embodiment of the present invention.

Referring to FIG. 6, the holographic data recording/reproduction apparatus records data on a holographic data storage medium 190 whose both sides are irradiated with light beams, and reproduces recorded data. The apparatus includes an optical pickup unit 100, which irradiates light beams to the holographic data storage medium 190 and receives the irradiated light beams, and a circuit unit (not shown).

The optical pickup unit 100 may include a light source 110, an optical path separator 130, a first objective lens 160, a second objective lens 170, and a photodetector (PD) 180.

The light source 110 emits light L. The optical path separator 130 branches the light L emitted by the light source 110 into a signal beam L1 and a reference beam L2. The first objective lens 160 condenses the signal beam L1 onto the holographic data storage medium 190, while the second objective lens 170 condenses the reference beam L2 onto the holographic data storage medium 190. The photodetector 180 detects a reproduction beam L2*r'* reflected from the holographic data storage medium 190.

The optical pickup unit 100 may further include first and second focus variation units 150 and 153, which vary a focal position of L1 and L2, respectively. In addition, the optical pickup unit 100 may further include a collimating lens 120, which collimates the light L emitted by the light source 110, and first through third reflection members 132, 134, and 136, which appropriately fold an optical path. Moreover, the optical pickup unit 100 may further include a servo optical system (not shown), which performs a servo operation.

The light source 110 and the optical path separator 130 constitute a light source unit that emits recording/reproduction beams.

The light source 110 may be, for example, a semiconductor laser diode (LD) that emits blue light.

The collimating lens 120 may collimate the recording/reproduction light L emitted by the light source 110. FIG. 6 exemplarily illustrates that the collimating lens 120 is interposed between the light source 110 and a polarization converter 125. As an alternative, the collimating lens 120 may be located between the polarization converter 125 and the optical path separator 130 or on other locations in the optical path.

Typically, the semiconductor that is used as the light source 110 mainly emits a laser beam of one polarization element. In this case, the polarization converter 125 may be located between the light source 110 and the optical path separator 130.

The polarization converter 125 may be a wave plate, such as a half-wave plate or a quarter-wave plate. When an active half-wave plate is used as the polarization converter 125, the wave plate rotates the polarization direction of linearly polarized light incident to the holographic data storage medium 190 and may convert the linearly polarized light into light with two orthogonal linearly polarization elements, that is, an S-polarization element and a P-polarization element. When an active quarter-wave plate is adopted as the polarization converter 125, it may convert predetermined incident linearly polarized light into circularly polarized light. The circularly polarized light may be decomposed into two orthogonal linearly polarization elements. As described above, the S-polarization element and the P-polarization element traveling through the polarization converter 125 may be used as the signal beam L1 and the reference beam L2, respectively, during a recording.

The polarization converter 125 may be an active type that performs a polarization conversion function during a recording operation and does not perform the polarization conversion function during a reproduction operation. That is, the polarization converter 125 may be an active half-wave plate or an active quarter-wave plate. When such active element is used as the polarization converter 125, almost all beams emitted by the light source 110 may be used as a reproduction beam during the reproduction operation.

The holographic data recording/reproduction apparatus embodies a micro-holography method in which an interference fringe formed by interference between the signal beam L1 and the reference beam L2 contains single-bit data for each focus. The light L emitted by the light source 110 is modulated and emitted bit by bit. Accordingly, since both the signal beam L1 and the reference beam L2 contain recording information, there is no substantial difference in a recording process between the signal beam L1 and the reference beam L2, and the terms "signal and reference beams" may be used interchangeably. For brevity, a light beam traveling through the same optical path as a reproduction beam L2*i'* incident to the holographic data storage medium 190 is denoted by the reference beam L2.

The optical path separator 130 may branch the light L emitted by the light source into two orthogonal polarization elements and allows the respective polarization elements to be irradiated to the holographic data storage medium 190 along separate optical paths. The optical path separator 130 may be a polarization beam splitter, which transmits or reflects light depending on a polarization direction. For example, the optical path separator 130 may directly transmit incident P-polarized light and reflect incident S-polarized light. In a reproduction mode, the optical path separator 130 may also separate the reproduction light L2*i'* incident to the holographic data storage medium 190 from the reproduction beam L2*r'* reflected from the holographic data storage medium 190.

The photodetector 180 may be located on one side of the optical path separator 130 to detect the reproduction beam L2*r'* that is reflected from the holographic data storage medium 190 and passes through the optical path separator 130.

The signal beam L1 and the reference beam L2, which are branched by the optical path separator 130, may pass through a condensing optical system and be incident on the holographic data storage medium 190.

The holographic data storage medium 190 may be a transmissive medium in which respective sides are irradiated with the signal beam L1 and the reference beam L2. In this case, the condensing optical system may be divided into a first condensing optical system that condenses the signal beam L1 and a second condensing optical system that condenses the reference beam L2. The shutter 140, the first focus variation unit 150, the first and second reflection members 132 and 134, a first quarter-wave plate 165, the first objective lens 160 may constitute the first condensing optical system that condenses the signal beam L1. The second focus variation unit 153, the third reflection member 136, a second quarter-wave plate 175, and the second objective lens 170 may constitute a second condensing optical system for condensing the reference beam L2.

The first through third reflection members 132, 134, and 136 may be optical members that fold the optical path to appropriately arrange optical devices. For example, the first through third reflection members 132, 134, and 136 may be mirrors or total reflection prisms.

The shutter 140 may be an optical member that transmits or blocks incident light. In the method of recording holographic information using the shutter 140 according to the exemplary embodiment of the present invention, the shutter 140 may operate as follows. In a recording operation, the shutter 140 allows the signal beam L1 to pass therethrough during recording of the hologram mark 10a and cuts off the signal beam L1 during recording of the homogeneous mark 10b. In a reproduction operation, the shutter 140 may prevent the reproduction beam L2'i from passing through the holographic data storage medium 190 and traveling through a predetermined path to the optical path separator 130 in an opposite direction to the signal beam L1.

The light L emitted by the light source 110 is not a completely linearly polarized light and may partially include another linearly polarized element. Thus, in the reproduction operation, the light L traveling from the light source 110 may pass through the optical path separator 130 as the reproduction beam L2'i, while part of the light L having another linearly polarized element may be reflected by the optical path separator 130. Since the shutter 140 cuts off incident light in the reproduction operation as described above, the part of the light L having another linearly polarized element may be cut off by the shutter 140 and not allowed to travel toward the holographic data storage medium 190.

When the method of recording holographic information according to the exemplary embodiment is embodied using an optical device other than the shutter 140, the shutter 140 may operate according to the other functions described above. Specifically, the shutter 140 may be open to directly transmit the signal beam L1 in a recording operation and may be closed to prevent the reproduction beam L2'i from passing through the holographic data storage medium 190 and traveling through a predetermined path to the optical path separator 130 in an opposite direction to the signal beam L1 in a reproduction operation.

The first and second focus variation units 150 and 153 vary focal positions of the signal beam L1 and the reference beam L2 in the holographic data storage medium 190. For example, the first focus variation unit 150 may include first and second relay lenses 151 and 152. The first relay lens 151 may be mechanically driven to move in the optical axis direction so as to vary the focal position of the signal beam L1. Also, the second focus variation unit 153 may include third and fourth relay lenses 154 and 155. The third relay lens 154 may be driven to move in an optical axis direction so as to vary the focal position of the reference beam L2.

As described above, since the focal positions of the signal and reference beams L1 and L2 are varied by the first and second focus variation units 150 and 153, holographic interference fringes, that is, the hologram mark 10a, may be recorded on multiple layers of the holographic data storage medium 190.

The first and second quarter-wave plate 165 and 175 may convert linearly polarized light incident to the holographic data storage medium 190 into circularly polarized light and may convert circularly polarized light reflected by the holographic data storage medium 190 into linearly polarized light.

A recording operation of the holographic data recording/reproduction apparatus using the shutter 140 according the method of the present invention will now be described.

Referring to FIGS. 3A through 3D, and 6, the light source 110 emits light L that is modulated according to data to be recorded in a recording operation. The polarization converter 125 converts the emitted light L into light with an S-polarization element and a P-polarization element, and the optical path separator 130 separates the converted light into P-polarized light and S-polarized light. For brevity, it is assumed that the S-polarized light is reflected by the optical path separator 130 and becomes a signal beam L1, while the P-polarized light is transmitted through the optical path separator 130 and becomes a reference beam L2. The signal beam L1 is branched by the optical path separator 130, passes through the shutter 140, the first focus variation unit 150, and the first and second reflection members 132 and 134, and is condensed by the first objective lens 160 and incident to one side of the holographic data storage medium 190. Also, the reference beam L2 is branched by the optical path separator 130, passes through the second focus variation unit 153, the third reflection member 136, and the second quarter-wave plate 175, and is condensed by the second objective lens 170 and incident to the other side of the holographic data storage medium 190.

The signal and reference beams L1 and L2 incident to respective sides of the holographic data storage medium 190 converge into a focus in the holographic data storage medium 190, and a hologram mark 10a containing single-bit data due to a holographic interference fringe is recorded in the focus.

After the hologram mark 10a is recorded in a predetermined focal position, when the signal beam L1 is cut off by the shutter 140, only the reference beam L2 is irradiated to the holographic data storage medium 190 so that a homogeneous mark 10b is recorded.

Figure 13:
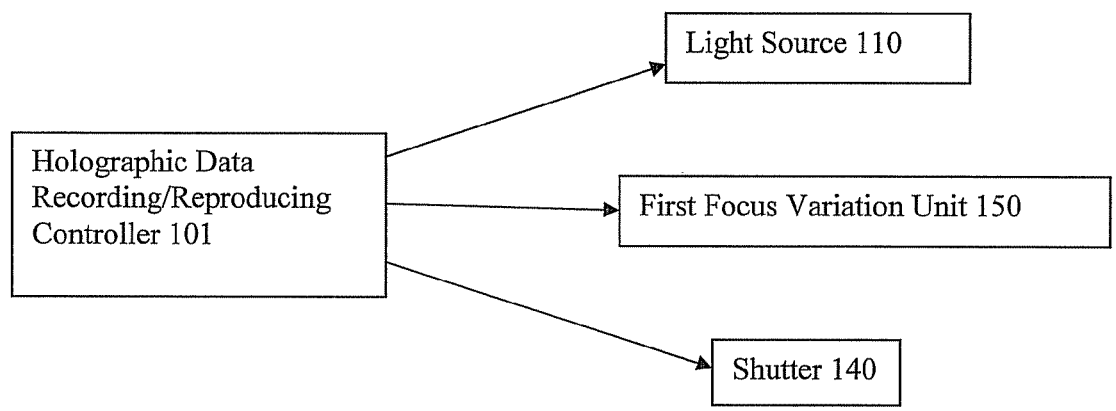
FIG. 13 is a schematic diagram showing the holographic data recording/reproducing controller, light source, first focus variation unit and shutter according to an exemplary embodiment of the present invention.

The operation of allowing the signal beam L1 to pass through the shutter 140 to record the hologram mark 10a and the operation of cutting off the signal beam L1 using the shutter 140 to record the homogeneous mark 10b may be repeated, thereby forming a single recording layer on which data is recorded. As shown in FIG. 13, the operation of the shutter 140 may be controlled by a holographic data recording/reproducing controller 101 according to whether a hologram mark 10a or a homogeneous mark 10b is to be recorded. Also, while varying the foci of the condensed signal and reference beams L1 and L2 using the first and second focus variation units 150 and 153, data may be recorded on a plurality of recording layers.

As described above, the recording method described with reference to FIGS. 3A through 3D may be modified. That is, the hologram mark 10a is recorded on a single layer, one of two beams may be cut off using the shutter 140 and the homogeneous mark 10b may be recorded again between the hologram marks 10a.

The light source 110 may emit unmodulated light L in a reproduction operation. When the light 110 is configured to emit only one linearly polarized light or the polarization converter 125 is an active type, light passing through the polarization converter 125 is light polarized linearly in one direction. For brevity, it is assumed that light passing through the polarization converter 125 is P-polarized light.

P-polarized light, that is, a reproduction beam L2i', which is transmitted through the optical path separator 130, may travel through the second focus variation unit 153, the third reflection member 136, and the second quarter-wave plate 175 and is condensed by the second objective lens 170 and incident to the holographic data storage medium 190. The incident reproduction beam L2i' may be reflected from the recording layer of the holographic data storage medium 190, and the reflected reproduction beam L2r' again passes through the second objective lens 170, the second quarter-wave plate 175, the third reflection member 136, the second focus variation unit 153 and is incident to the optical path separator 130. In this case, the polarization direction of the reproduction beam L2r' reflected from the holographic data storage medium 190 is changed so that the reproduction beam L2r' is reflected by the optical path separator 130 and incident to the photodetector 180.

While it is exemplarily described above that the holographic data recording/reproduction apparatus operates using the shutter 140, the present invention is not limited thereto. As stated above, a focus controller may be used instead of the shutter 140. Alternatively, while employing light beams emitted from a single light source, coherence may be varied by changing driving conditions of the light source. Alternatively, two independent light sources may be adopted.

When the focus controller is used or when coherence is varied by changing the driving conditions of the single light source, the holographic data recording/reproduction apparatus of FIG. 6 or other holographic data recording/reproduction apparatus with a different optical construction may be employed. An example of an optical system of a holographic data recording/reproduction apparatus using two independent light sources will be described later.

Figure 7A:
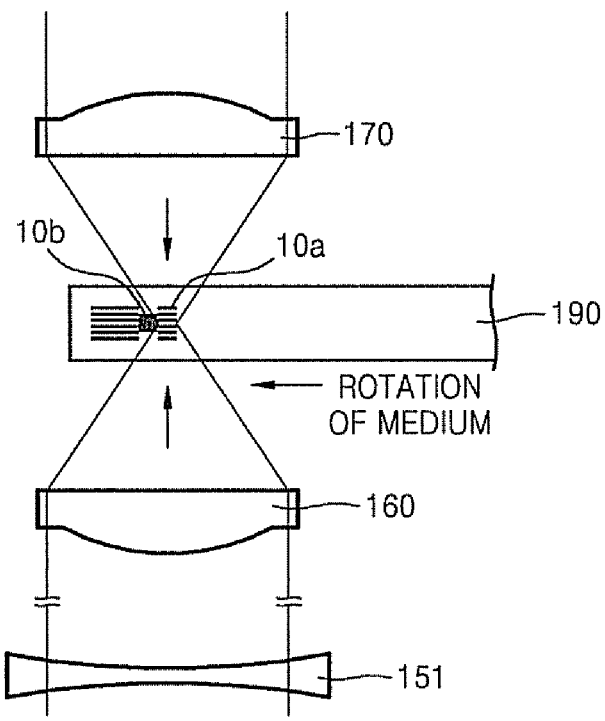
FIGS. 7A and 7B are schematic diagrams illustrating a method of recording holographic information using a focus adjuster according to an exemplary embodiment of the present invention.
Figure 7B:
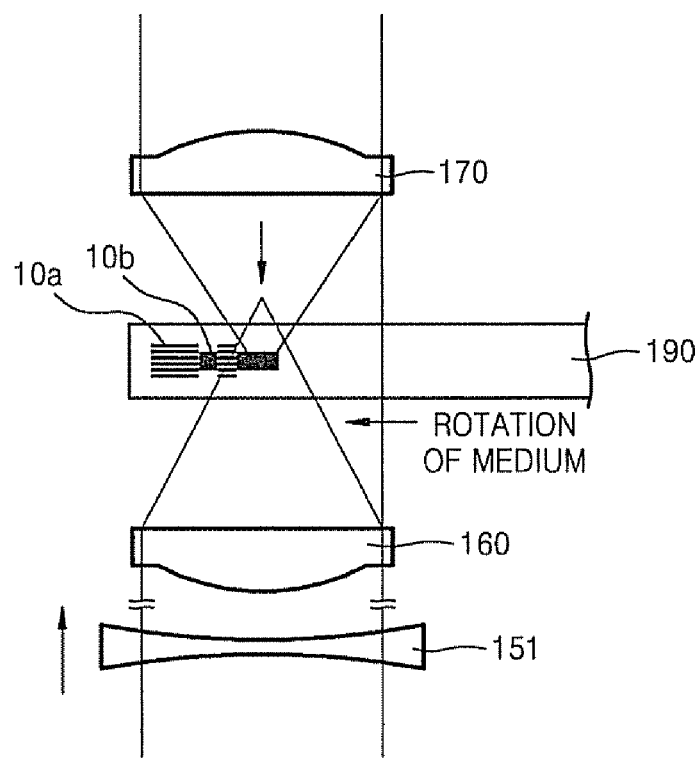

FIGS. 7A and 7B are schematic diagrams illustrating a method of recording holographic information using a focus controller according to an exemplary embodiment of the present invention. Specifically, in the present exemplary embodiment, the optical system of FIG. 6 is used, and the first relay lens 151 of the first focus variation unit 150 disposed on the path of the signal beam L1 is used as the focus controller. Thus, FIGS. 7A and 7B illustrate a partial process of recording data by controlling a focal position of one of two incident light beams according to the rotation of the holographic data storage medium 190.

Referring to FIG. 7A, when two light beams are incident from the light source 110 to respective sides of the holographic data storage medium 190 and condensed into a focus, an interference fringe is generated. Since the refractive index of the holographic data storage medium 190 varies in proportion to the intensity of the interference fringe, the hologram mark 10a having a periodic variation in refractive index, which is illustrated with a fringe, is recorded in the holographic data storage medium 190. Here, the focus is located on a virtual recording layer on which the hologram mark 10a is to be formed.

Referring to FIG. 7B, when a focal position of one light beam is changed by driving the focus controller (i.e., the first relay lens 151 of the first focus variation unit 150), an interference fringe caused by two light beams is only slightly formed at a recording position, so that the homogeneous mark 10b, which has an almost uniform refractive index distribution unlike the hologram mark 10a, is recorded.

When controlling a position of the first relay lens 151 in the optical axis direction, the hologram mark 10a with interference fringes and the homogeneous mark 10b with a uniform variation in refractive index are alternately formed in the holographic data storage medium 190. As shown in FIG. 13, the operation of the first focus variation unit 150 may be controlled by a holographic data recording/reproducing controller 101 according to whether a hologram mark 10a or a homogeneous mark 10b is to be recorded.

As described above, the recording method using the focus controller according to FIGS. 7A and 7B may be modified. In particular, an entire predetermined recording layer may be recorded to provide the hologram mark 10a, and after the hologram marks 10a are recorded on a predetermined recording layer, the focal position of one of two beams may be changed such that an interference fringe caused by the two beams is only slightly formed on the recording layer, thereby recording the homogeneous mark 10b between the hologram marks 10a.

As a further alternative, when coherence is varied by changing driving conditions (e.g., a driving frequency) of the light source 110 of FIG. 6, the hologram marks 10a and the homogeneous marks 10b may be alternately formed.

Figure 8A:
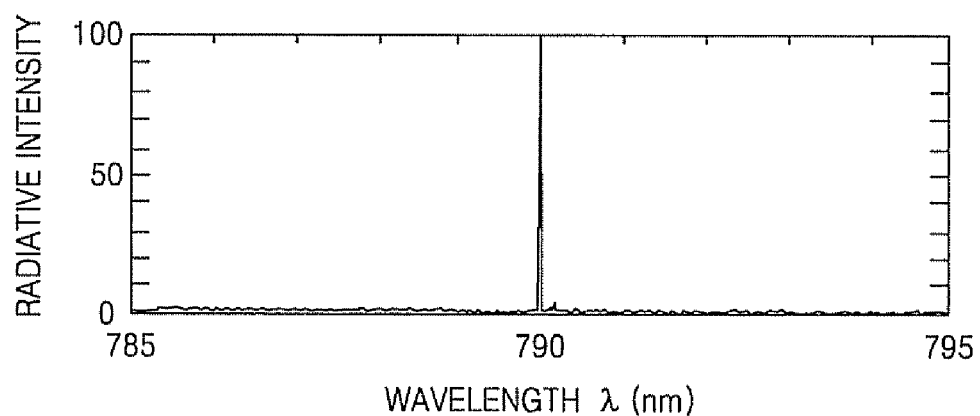
FIGS. 8A and 8B show a lasing spectrum and the visibility of an interference fringe, respectively, when a semiconductor laser diode (LD) oscillates in a single mode.
Figure 8B:
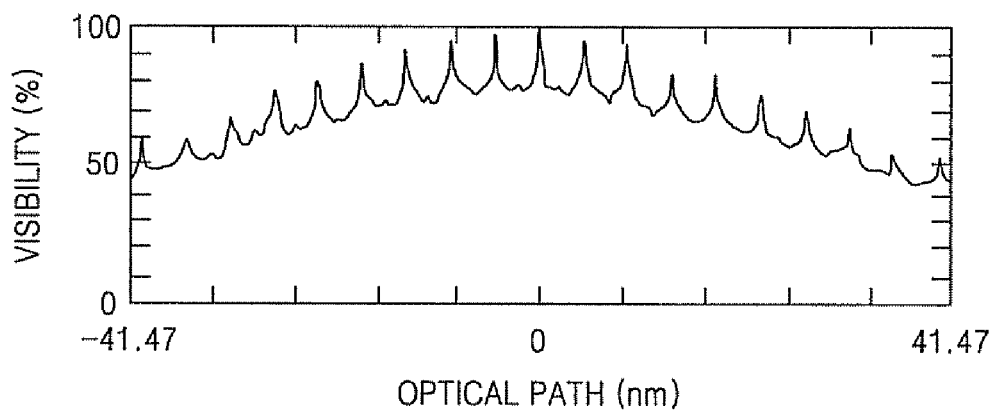
Figure 9A:
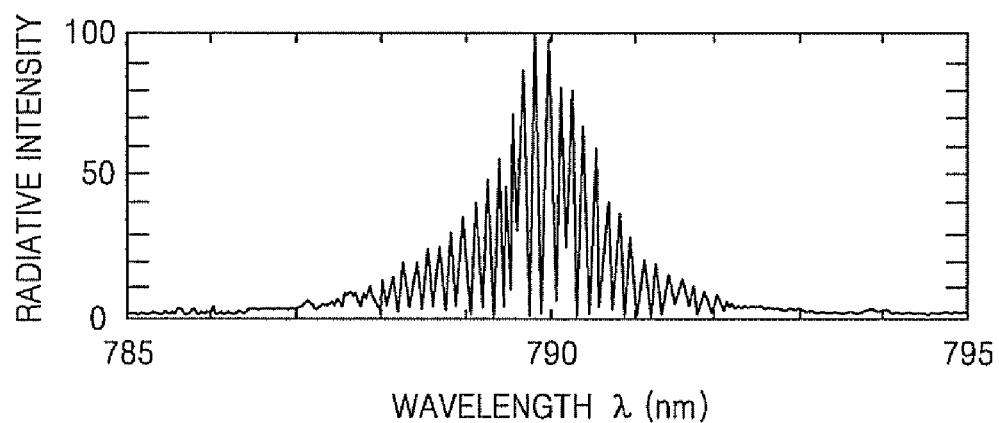
FIGS. 9A and 9B show a lasing spectrum and the visibility of an interference fringe, respectively, when a semiconductor LD oscillates in a multi-mode.
Figure 9B:
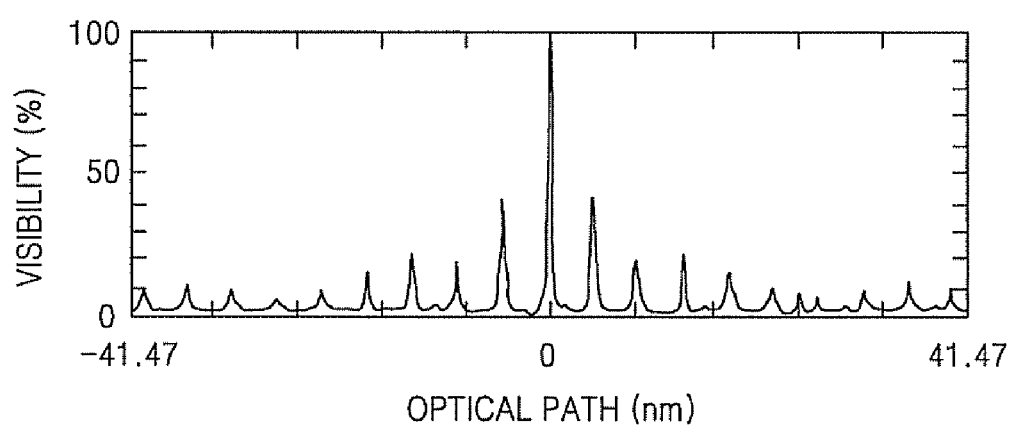

FIGS. 8A and 8B show a lasing spectrum and the visibility of an interference fringe, respectively, when a semiconductor LD functioning as the light source 110 oscillates in a single mode. FIGS. 9A and 9B show a lasing spectrum and the visibility of an interference fringe, respectively, when a semiconductor LD functioning as the light source 110 oscillates in a multi-mode.

Referring to FIGS. 8A and 8B, it can be observed that when the semiconductor LD oscillates in the single mode, interference fringes are uniformly formed. In contrast, referring to FIGS. 9A and 9B, it can be observed that when the semiconductor LD oscillates in the multi-mode, interference fringes are formed at rare intervals. From this result, it can be seen that interference fringes are not properly formed due to poor coherence during multi-mode oscillation.

Figure 10A:
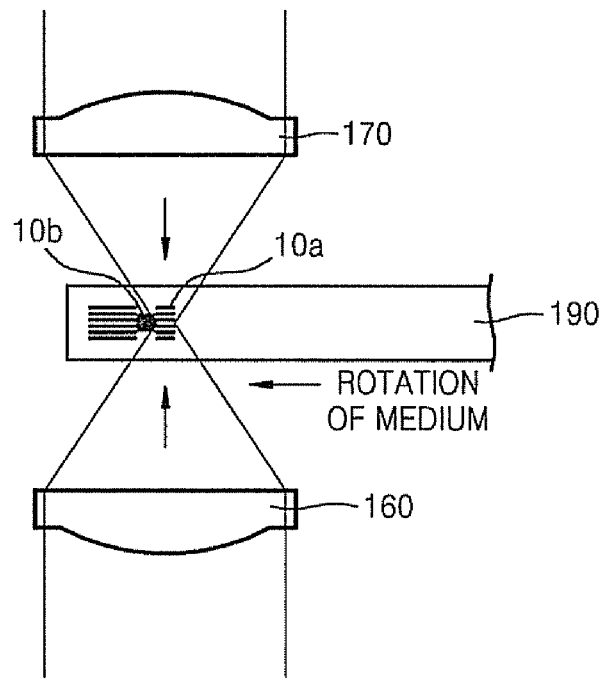
FIGS. 10A and 10B are schematic diagrams illustrating a method of recording holographic information according to an exemplary embodiment of the present invention when coherence is varied by changing driving conditions of a light source.
Figure 10B:
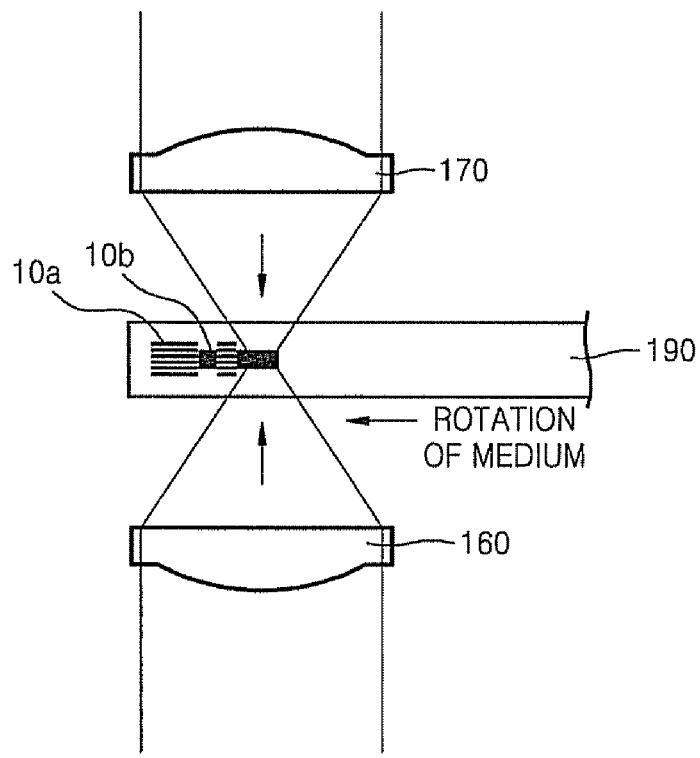

FIGS. 10A and 10B are schematic diagrams illustrating a method of recording holographic information using the optical configuration of FIG. 6 according to an exemplary embodiment of the present invention in which coherence is varied by changing the driving conditions of the light source 110. Specifically, FIGS. 10A and 10B illustrate a partial process of alternately recording the hologram mark 10a and the homogeneous mark 10b in the holographic data storage medium 190 by varying the coherence of light emitted by the light source 110.

Referring to FIG. 10A, which illustrates a case where the light source 110 is driven to emit light with good coherence, when two light beams are incident from the light source 110 to both sides of the holographic data storage medium 190 and condensed into a focus, an interference fringe is generated. Since the refractive index of the holographic data storage medium 190 varies in proportion to the intensity of the interference fringe, the hologram mark 10a having a periodic variation in refractive index, which is illustrated with a fringe, is recorded in the holographic data storage medium 190. Here, the focus is located on a virtual recording layer on which the hologram mark 10a is to be formed.

Referring to FIG. 10B, which illustrates a case where the light source 110 is driven to emit light with poor coherence, even if two light beams are incident from the light source 110 to both sides of the holographic data storage medium 190 and condensed into a focus, an interference fringe is not properly formed due to the poor coherence. As a result, the interference fringe is only slightly formed so that the homogeneous mark 10b, which has an almost uniform refractive index distribution unlike the hologram mark 10a, is recorded. As shown in FIG. 13, the driving of the light source 110 may be controlled by a holographic data recording/reproducing controller 101 according to whether a hologram mark 10a or a homogeneous mark 10b is to be recorded.

Figure 11:
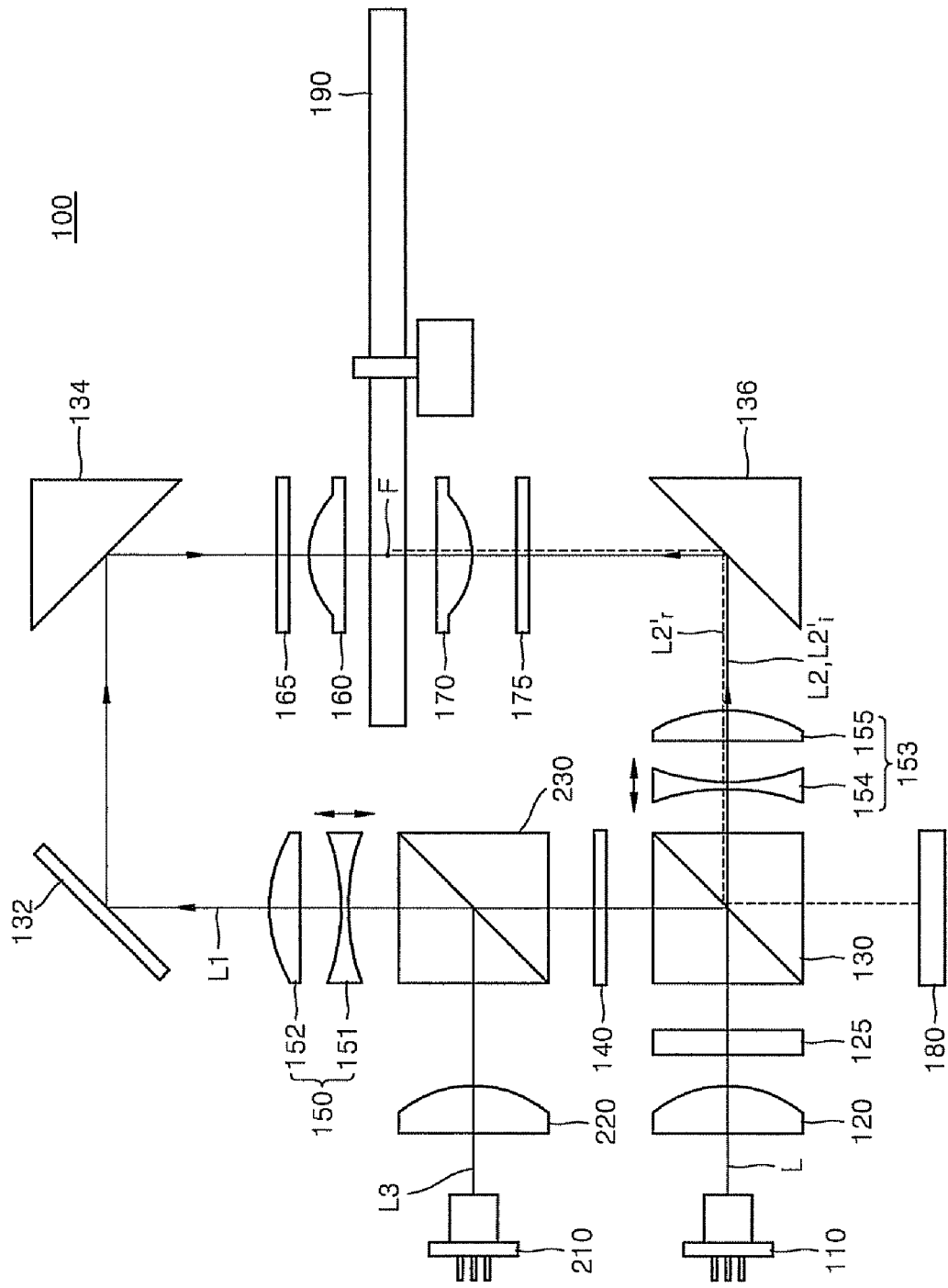
FIG. 11 is a diagram showing another example of an optical construction of a holographic data recording/reproduction apparatus capable of embodying a method of recording holographic information according to an exemplary embodiment of the present invention.
Figure 12A:
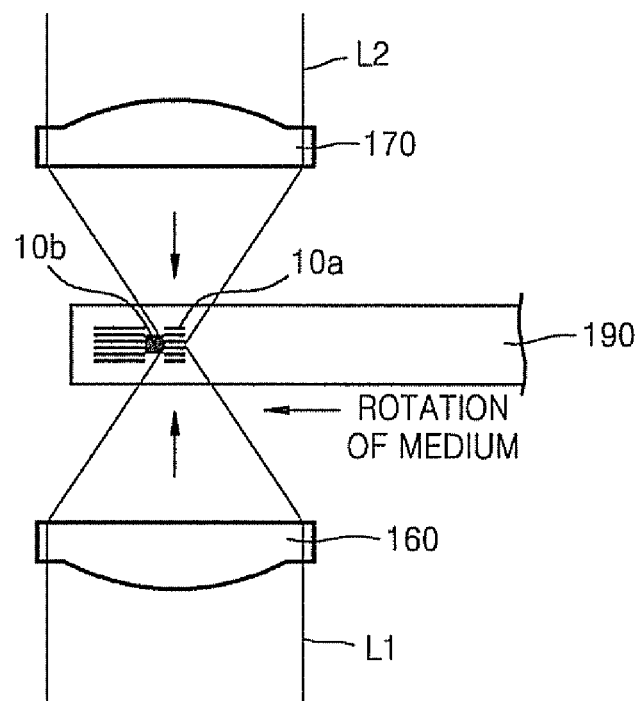
FIGS. 12A and 12B are schematic diagrams illustrating a method of recording holographic information using two independent light sources according to an exemplary embodiment of the present invention.
Figure 12B:
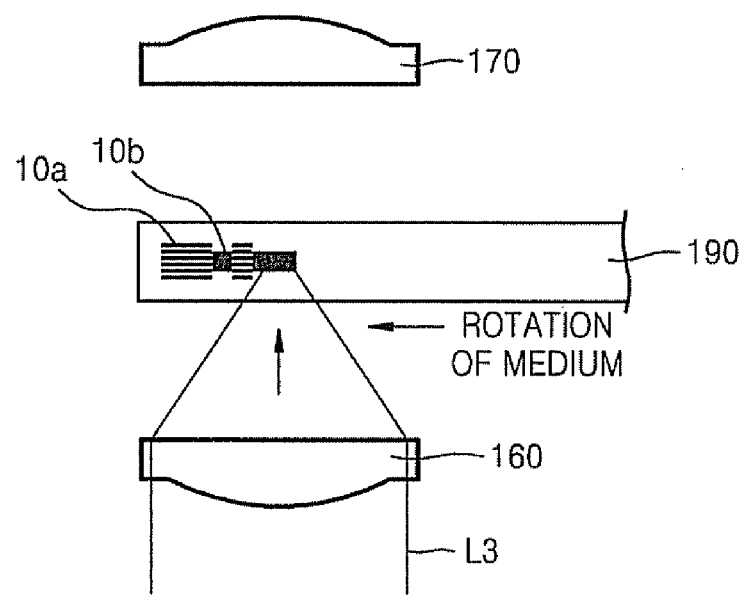

FIG. 11 is a diagram showing an example of an optical construction of a holographic data recording/reproduction apparatus using two independent light sources to embody a method of recording holographic information according to an exemplary embodiment of the present invention. FIGS. 12A and 12B are schematic diagrams illustrating a method of recording holographic information using two independent light sources according to an exemplary embodiment of the present invention.

An optical system of FIG. 11 is almost substantially the same as that of FIG. 6 except that the holographic data recording/reproduction apparatus further includes a light source 210 that emits a light beam L3 used in forming the homogeneous mark 10b, a collimating lens 220 that collimates the light beam L3, and a beam splitter 230 that combines the optical paths of the beams L3 and L1 to allow the light beam L3 to travel along the same optical path as the signal beam L1. FIG. 11 illustrates the beam splitter 230 interposed between the shutter 140 and the first focus variation unit 150, but the present invention is not limited thereto. Alternatively, the light source 210, the collimating lens 220, and the beam splitter 230 may be located to allow the light beam L3 to travel along an optical path of the reference beam L2.

Referring to FIG. 12A, during the recording of the hologram mark 10a, only the light source 110 is driven to irradiate the signal beam L1 and the reference beam L2 onto the holographic data storage medium 190 so that the hologram mark 10a can be recorded.

Referring to FIG. 12B, during the recording of the homogeneous mark 10b, the light source 110 is switched off and only the light source 210 is driven to irradiate the light beam L3 onto the holographic data storage medium 190 so that the homogeneous mark 10b may be recorded.

As described above, the two independent light sources 110 and 210 alternately driven so that the hologram mark 10a and the homogeneous mark 10b are alternately recorded. Alternatively, after the hologram mark 10a is recorded on a single recording layer using the light source 110, the light source 210 may be driven to record the homogeneous mark 10b between the hologram marks 10a.

Hereinabove, it is described and illustrated that the shutter 140 or the focus controller is used, coherence of light emitted by the light source 110 is varied, or two independent light sources 110 and 210 are used in order to embody a method of recording holographic information according to exemplary embodiments of the present invention. However, the present invention is not limited to the above-described methods, and any recording method that locates the homogeneous mark 10b between the hologram marks 10a may be applied.

Also, construction of an optical system of a holographic data recording/reproduction apparatus that embodies a method of recording holographic information according to exemplary embodiments of the present invention is not limited to FIGS. 6 and 11 and other various constructions may be applied to the optical system according to the present invention.

Furthermore, it is described above on the assumption that a method of recording holographic information according to exemplary embodiments of the present invention is applied to all recording layers. However, it is unnecessary from a practical standpoint to use the above-described method on all layers because a recording layer disposed on the farthest recording layer from an incident surface affects only a reproduction operation. Accordingly, although it is possible to record a hologram mark and a homogeneous mark alternately on all recording layers, it is also possible, if desired, to apply the method of the present invention only to recording layers that are positioned to affect other layers. For example, during multilayered recording of a holographic data storage medium, it is possible to refrain from applying the method according to embodiments of the present invention to at least one recording layer that affects less to an adjacent recording layer out of all recording layers. Thus, only a hologram mark may be recorded on the at least one recording layer, while the hologram mark and a homogeneous mark may be recorded to be alternately located on the remaining recording layers.

In addition, it is described that a holographic data recording/reproduction apparatus for embodying a method of recording holographic information according to exemplary embodiments is a two-sided incidence type, but the present invention is not limited thereto. For example, a one-sided incidence type holographic data recording/reproduction apparatus may be also used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording holographic information, the method comprising recording a hologram mark and a homogeneous mark in a holographic data storage medium having a volume to alternatively locate the hologram mark and the homogeneous mark, the hologram mark having a varied refractive index distribution due to constructive/destructive interferences between two light beams used to create the hologram mark and indicating information, and the homogeneous mark having a refractive index distribution that is more uniform than the refractive index distribution of the hologram mark, wherein recording of the homogeneous mark comprises cutting off one of the two light beams used for recording the hologram mark such that the homogeneous mark uses only the other one of the two light beams.

2. The method of claim 1, wherein a thickness or refractive index variation of the homogeneous mark is controlled such that a phase shift of a light beam passing through the homogeneous mark is about the same as a phase shift of a light beam that passes through the hologram mark.

3. The method of claim 1, wherein the homogeneous mark is recorded using a first light source and the hologram mark is recorded using a second light source.

4. The method of claim 1, wherein recording of the homogeneous mark is performed by changing a focal position of one of the two light beams used for recording the hologram mark to reduce formation of an interference fringe.

5. The method of claim 1, wherein the hologram mark and the homogeneous mark are recorded using the same light source while varying coherence by changing driving conditions of the light source, such that when the light source is driven to have a relatively greater coherence, the hologram mark is recorded and when the light source is driven to have a relatively lesser coherence, the homogeneous mark is recorded.

6. The method of claim 1, wherein the method includes forming a plurality of virtual recording layers in the holographic data storage medium.

7. The method of claim 6 wherein the recording of the hologram mark and the homogeneous mark is carried out on all of the virtual recording layers.

8. The method of claim 6, wherein in the forming of a plurality of virtual recording layers, only a hologram mark is recorded in at least one recording layer that affects less to an adjacent recording layer out of all recording layers, and wherein a hologram mark and a homogeneous mark are alternately recorded on the remaining recording layers.

9. A holographic data storage medium comprising:
a material having a volume and having marks recorded within the volume, the marks comprising:
a plurality of recorded hologram marks representing data and having a varied refractive index distribution formed by constructive/destructive interferences between two light beams; and
a plurality of recorded homogeneous marks being interspersed between the plurality of hologram marks and having a refractive index distribution that is more uniform than the refractive index distribution of the hologram marks, wherein the homogeneous marks are recorded by cutting off one of the two light beams used for recording the hologram mark such that the homogeneous mark uses only the other one of the two light beams.

10. The holographic data storage medium of claim 9, having a plurality of virtual recording layers within the volume, each recording layer including a plurality of the recorded hologram marks and a plurality of the recorded homogeneous marks.

11. The holographic data storage medium of claim 10, wherein in each recording layer, a phase shift of a light beam passing through one of the homogeneous marks is about the same as a phase shift of a light beam that passes through one of the hologram marks.

12. The holographic data storage medium of claim 10, wherein at least one recording layer includes holographic marks formed by multi-wavelength recording and wherein a mark reflection rate of the recording layer is uniform.

* * * * *